(12) United States Patent
Hermann

(10) Patent No.: US 9,941,555 B2
(45) Date of Patent: Apr. 10, 2018

(54) PERFORATION APPARATUS AND METHOD FOR ELECTRIC VEHICLE BATTERY ENCLOSURE

(75) Inventor: Weston A. Hermann, Palo Alto, CA (US)

(73) Assignee: TESLA, INC., Palo Alto, CA (US)

( * ) Notice: Subject to any disclaimer, the term of this patent is extended or adjusted under 35 U.S.C. 154(b) by 1750 days.

(21) Appl. No.: 12/942,501

(22) Filed: Nov. 9, 2010

(65) Prior Publication Data

US 2012/0111445 A1 May 10, 2012

(51) Int. Cl.
*H01M 10/613* (2014.01)
*H01M 10/625* (2014.01)
*H01M 10/6567* (2014.01)

(52) U.S. Cl.
CPC ....... *H01M 10/613* (2015.04); *H01M 10/625* (2015.04); *H01M 10/6567* (2015.04); *Y10T 29/49108* (2015.01)

(58) Field of Classification Search
CPC ......... H01M 10/5004; H01M 10/5016; H01M 10/5008; H01M 10/5075
USPC ................. 429/71, 72, 83, 120; 180/68.5
See application file for complete search history.

(56) References Cited

U.S. PATENT DOCUMENTS

| 2,516,084 | A | * | 7/1950 | Wells | ............................. 429/72 |
| 2008/0318121 | A1 | * | 12/2008 | Takagi | ......................... 429/120 |
| 2009/0035647 | A1 | * | 2/2009 | Takagi | ............................ 429/53 |

FOREIGN PATENT DOCUMENTS

JP          2009238654 A   * 10/2009

* cited by examiner

*Primary Examiner* — Maria Laios
(74) *Attorney, Agent, or Firm* — Garlick & Markison; Bruce E. Garlick

(57) ABSTRACT

A perforation tool for a battery enclosure system of a vehicle battery pack, comprising: an engaging tip configured to mechanically breach a thermal-control-agent-retaining enclosure of a traction battery pack including a plurality of interconnected batteries with the enclosure reinforced for mechanical protection of the batteries when installed in an electric vehicle; a port for receiving a thermal-control agent having a pressure in a range of about 5-100 psi; and a housing, coupled to the tip and to the port, wherein the tip includes an aperture and wherein the housing includes a channel communicating the port to the aperture wherein the pressurized thermal-control agent is produced at the tip at about the pressure.

10 Claims, 2 Drawing Sheets

PERFORATION APPARATUS AND METHOD FOR ELECTRIC VEHICLE BATTERY ENCLOSURE

CROSS REFERENCE TO RELATED APPLICATIONS

This is application is related to co-pending U.S. application Ser. No. 12/942,465 filed on even date and commonly assigned, the contents of which are hereby expressly incorporated by reference for all purposes.

BACKGROUND OF THE INVENTION

The present invention relates generally to fluid ingress into an electric vehicle battery enclosure, and more particularly to a fill port access system permitting efficient application of water inside the enclosure in order to control any excessive thermal condition of the individual battery cells and modules.

Battery packs used with electric vehicles store large amounts of energy in a small space, producing high energy densities. These battery packs include an external housing that is designed for more than just environmental protection and packaging efficiency. The housing also enhances safety and stability, particularly under a range of anticipated abnormal operating conditions.

The battery packs are designed to provide high levels of safety and stability, yet situations can arise where a portion of a battery pack experiences a "short-circuit" condition which releases energy as heat. This short-circuit can occur from failure of a battery cell or from mechanical damage, such as a collision that damages an internal arrangement of cells of the battery pack.

The heat released from the short-circuit can be great enough, depending upon many factors including an amount of energy being converted and location of the short-circuit, to initiate a chain reaction. The chain reaction results from a heating of adjacent cells, which can cause them to overheat and fail, releasing heat that, in turn, propagates throughout the battery pack.

Once the reaction starts, it can continue to spread throughout the battery pack or a portion thereof until overheating cells are sufficiently cooled or the entire battery pack or the portion is consumed. A typical battery pack has a high thermal mass, mostly due to the mass of the cells. A failure of an individual cell provides for a relatively low energy release. Also, surrounding battery cells must be heated to as much as 200° C. or higher before they in turn release energy. These three factors mean that a full reaction that consumes all the cells of a battery pack may take anywhere from tens of minutes to many hours.

A conventional solution for a problem of an initiated chain reaction is to simply permit, once passengers and bystanders are clear of the vehicle, the reaction is allowed to run its course. While this situation is rare and designs are implemented to continue to make such situations ever more unlikely, there are some situations where it may be advantageous to terminate the reaction early (particularly to terminate additional heat release at will).

There are several factors that add to the challenges of early termination of such a reaction. One of these factors is the external housing. The housing has been engineered to resist structural corruption, by venting internally generated gases and resisting damage to the housing integrity from mechanical impacts/damage. The housing also provides environmental protection from water/moisture ingress. To do this, the housing is particularly engineered as a sealed, strong, metallic or fiber-reinforced polymer enclosure. To mitigate/extinguish an internal short-circuit reaction by application of any externality (e.g., water or heat-removing agents) directly to the outside of the housing is largely ineffective because the housing prevents the externality from direct contact with the cells.

It is further difficult to control the chain reaction because oxygen is released from some battery cathode materials during these reactions making it difficult to control the reaction by removing oxygen. The most effective way to control/limit potential and actual multiple-cell thermal runaway scenarios is to remove excess heat inducing reactions in other cells and, because of the large thermal mass, the best way to remove heat is for there to be direct contact between the affected cells and the heat-removing agent.

Issues surrounding the internal layout of the battery cells, protecting against accidental electrical energy release, ensuring safety from hot gas exhaust, and properly locating any solution within an electric vehicle form factor (among other considerations) make it a challenge to produce an acceptable solution.

The incorporated patent application referenced herein describes an effective and efficient solution for providing coolant agent ingress of a high energy density battery enclosure during an internal thermal event. Preferred embodiments of those solutions include use of a special fill port manufactured into an enclosure, among other elements. The solution could be improved in at least two situations: 1) enclosures manufactured without the special fill port and/or 2) enclosures wherein the fill port is unavailable in a specific instance (e.g., an orientation of the vehicle).

What is needed is an apparatus and method for providing coolant agent ingress of a high energy density battery enclosure during an internal thermal event for situations in which a special fill port is unavailable.

BRIEF SUMMARY OF THE INVENTION

Disclosed is an apparatus, system, and method providing for coolant agent ingress of a high energy density battery enclosure during an internal thermal event for situations in which a special fill port is unavailable. A solution includes a battery enclosure configured for perforation using an enclosure perforating tool and, in some embodiments, an associated vehicle structure providing locally weakened perforation zone. Preferably the perforation zone is positioned so an operator is clear from any hot gases exiting from the enclosure during perforation/filling.

A perforation-enabled battery enclosure system for a vehicle battery pack, the system including a thermal-control-agent-retaining enclosure of a traction battery pack including a plurality of interconnected batteries with the enclosure reinforced for mechanical protection of the batteries when installed in an electric vehicle; and a perforation region defined in a portion of a wall of the enclosure, the perforation region configured with a selectably mechanically weakened wall allowing controlled breaching that defines an inlet port permitting an ingress of a thermal-control agent into the enclosure through the inlet port.

A perforation-enabled battery enclosure system for a vehicle battery pack, the system including an electric vehicle including a chassis and a body; a thermal-control-agent-retaining enclosure of a traction battery pack including a plurality of interconnected batteries with the enclosure reinforced for mechanical protection of the batteries when installed in the electric vehicle; a perforation region defined in a portion of a wall of the enclosure, the perforation region configured with a selectably mechanically weakened wall allowing controlled breaching that defines an inlet port permitting an ingress of a thermal-control agent into the enclosure through the inlet port; and a perforation tool, the tool including a tip, a fill port, and a channel communicating the fill port to an aperture defined proximate the tip, the tip mechanically breaching the wall to define the inlet port, the tool engaging the enclosure to resist disengagement when the thermal-control agent is pumped into the enclosure through the perforation tool at a pressure in a range of about 5-100 psi.

A perforation tool for a battery enclosure system of a vehicle battery pack, comprising:
an engaging tip configured to mechanically breach a thermal-control-agent-retaining enclosure of a traction battery pack including a plurality of interconnected batteries with the enclosure reinforced for mechanical protection of the batteries when installed in an electric vehicle; a port for receiving a thermal-control agent having a pressure in a range of about 5-100 psi; and a housing, coupled to the tip and to the port, wherein the tip includes an aperture and wherein the housing includes a channel communicating the port to the aperture wherein the pressurized thermal-control agent is produced at the tip at about the pressure.

A manufacturing method for a perforation-enabled battery enclosure system for a vehicle battery pack, including a) enclosing the vehicle battery pack within a thermal-control-agent-retaining enclosure of a traction battery pack including a plurality of interconnected batteries with the enclosure reinforced for mechanical protection of the batteries when installed in an electric vehicle; and b) enabling access to an interior of the enclosure through a perforation port to be created post-manufacture in a portion of a wall of the enclosure, the portion of the wall mechanically weakened wherein other portions of the wall maintain increased structural integrity.

A method for filling a perforation-enabled battery enclosure system for a vehicle battery pack with a thermal-control agent, including a) perforating a thermal-control-agent-retaining enclosure of a traction battery pack including a plurality of interconnected batteries with the enclosure reinforced for mechanical protection of the batteries when installed in an electric vehicle wherein the perforating step breaches a region of a wall of the enclosure to produce a perforation port; and b) filling the enclosure through the perforation port formed in the portion of the wall of the enclosure.

Features/benefits include an ability to terminate/mitigate a runaway thermal condition inside a battery enclosure for a high energy battery pack, such as the type used in electric vehicles and similar applications. Other features, benefits, and advantages of the present invention will be apparent upon a review of the present disclosure, including the specification, drawings, and claims.

DETAILED DESCRIPTION OF THE INVENTION

Embodiments of the present invention include an apparatus and method providing for coolant agent ingress of a high energy density battery enclosure during an internal thermal event. The following description is presented to enable one of ordinary skill in the art to make and use the invention and is provided in the context of a patent application and its requirements. In the following text, the terms "energy storage system", "energy storage assembly", "battery", "cell", "brick", "battery cell", "battery cell pack", "pack" "electrolytic double-layer capacitor", and "ultracapacitor" may be used interchangeably (unless the context indicates otherwise) and may refer to any of a variety of different rechargeable configurations and cell chemistries described herein including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration. A context for one implementation is use of rechargeable Li-ion battery packs designed for plug-in electric vehicles (PHEV, HEV, and EV and the like), though other industrial applications for such high-energy battery packs may implement variations to the invention described herein without departing from the present invention.

Figure 1:
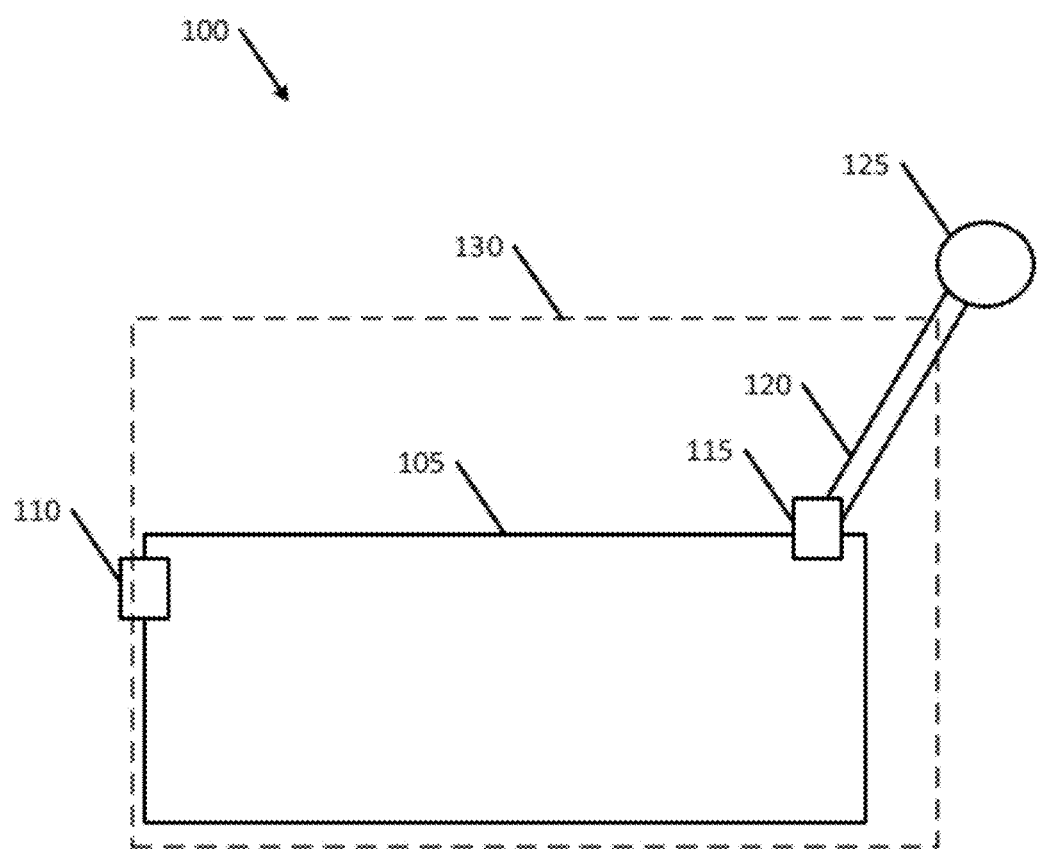
FIG. 1 is a schematic block diagram illustrating a preferred embodiment of the present invention.

FIG. 1 is a schematic block diagram illustrating a preferred embodiment of the present invention for a fillable battery enclosure system 100. System 100 includes an enclosure 105 for a high electric energy density storage system. Enclosure 105 includes one or more exit vents 110 and one or more fill ports 115. As explained further herein, fill port 115 may include a fill port coupler made up of a passageway 1120 and an externally accessible port 125. System 100 of the preferred embodiment is incorporated into, and includes in some implementations, a passenger vehicle 130.

Enclosure 105 is preferably a sealed, rugged metallic case that provides the structural, environmental, and safety protections of the battery pack. Not shown are the many internal energy storage elements that make up the energy storage characteristic of the pack. While the specifics of battery pack design will vary, the following description is provided to simplify a discussion of the present invention.

Each cell used in the battery includes a small form factor battery cell, an 18650 cell, which is just a bit larger than a AA battery. Due to its small size, any single cell contains a limited amount of energy. The battery pack includes about 6800 of these 18650 cells, and the entire pack has a mass of about 450 kg.

The cells also incorporate numerous mechanical, thermal, and chemical factors that contribute to their safety in a battery pack. For example, cells used in some battery packs are all packaged in steel cans. This feature offers multiple safety benefits. From a mechanical standpoint, the steel case of each cell provides structural rigidity and strength. This helps dissipate extreme mechanical loading as well as providing protection against objects penetrating or compressing a cell and thereby shorting it. From a thermal standpoint, the steel case also offers good thermal conductivity and control of gas released during a failure. The dissipation of heat from a cell both extends battery life and helps maintain the pack at an even temperature. From a chemical and materials standpoint, the materials used in the cell's construction can greatly impact the flammability and initiation temperature of thermal runaway.

Due to the size and weight of the battery pack, there is an opportunity to add many more safety features than can be contained in other configurations, such as a laptop battery pack. Overall, some of these battery pack safety features are active and others are passive. Some are mechanical and others are electrical. For example, the battery pack is controlled internally by several embedded microprocessors that operate both when the battery pack is installed in the vehicle. An example of a passive safety feature is the selection of aluminum or steel for the battery pack enclosure instead of plastic as in laptop battery packs. The aluminum or steel provides greater structural strength in case of mechanical abuse tolerance and does not easily melt or burn.

Architecturally, the battery pack includes eleven battery modules, a main control and logic PCB (printed circuit board), and a 12V DC-DC power supply. Each of the eleven modules carries a monitoring PCB (with its own microprocessor) that communicates with the rest of the vehicle microcontrollers, broadcasting the voltage and temperature measurements of its module over a standard CAN bus.

There are tubes and a manifold as part of the enclosure (not shown) that extend out of the battery pack. During operation, these are used to circulate a cooling fluid (a 50/50 mix of water and glycol) throughout the pack via sealed fluid paths isolated from the cells themselves. This enables the cells of the pack to be kept thermally balanced, and extends the life of the battery pack while also having numerous safety benefits.

This cooling system design is especially effective because it combines thousands of small cells rather than several large ones to build the battery pack dramatically increasing the surface to volume ratio. Surface area is essential to cooling batteries since the surface is where heat is removed; more is better. Also, because of their small size, each cell is able to quickly redistribute heat within, and shed heat to, the cooling system making it essentially isothermal. This cooling architecture avoids "hot spots" which can lead to failures in battery modules with larger cells.

The microprocessors, logic circuitry and sensors are continually monitoring voltages, currents and temperatures within the pack. These sensors also monitor inertia acceleration (e.g. to detect a crash) and vehicle orientation to the ground (e.g. to detect a rollover). The battery packs also include humidity, and moisture sensors. Should certain sensors exceed the specified range, then high voltage contactors will immediately (within milliseconds) disconnect the high voltage of the battery pack from the car. The battery pack design incorporates an array of passive safety features as well. The passive design improves the robustness of the battery pack, particularly against mechanical damage and potential foreign object penetration of the battery pack.

None of the battery pack's high voltage systems are accessible to accidental contact outside their protective enclosures and jacketed cables. Only with special tools can someone gain access to any high-voltage components. The high-voltage systems are enclosed, labeled, and color coded with markings that service technicians and first responders already understand.

Finally, the battery pack enclosure is designed to contain all the battery modules, fuses, bus bars, and safety circuitry of the system. The enclosure is electrically isolated from the battery pack and prevents users from directly accessing any high voltage connections. The enclosure is also designed to withstand substantial abuse in the vehicle, including collision, while maintaining the integrity of the battery modules and circuitry inside.

So much of the design of the sealed enclosure is specifically intended to resist simple ingress of a thermal-control agent (e.g., water or the like), therefore purposeful ingress and effective distribution of such an agent in an urgent situation by a party unfamiliar with assembly and operation of a battery pack is challenging. The design of system 100 is intended to address such a situation and to fulfill such needs. To enhance readability, the rest of the disclosure will refer to the thermal-control agent as water since water is the preferred agent of choice in the present scenario. However, other suitable thermal-control agents may be used without departing from the spirit of the invention.

It becomes difficult to externally force the water into sealed enclosure 105 in order to surround and cool any overheated or overheating cell. Traditional battery pack design includes pressure equalization vents that help to reduce enclosure stress during changes in ambient pressure. Often such vents are bi-directional valves that operate at about 1 psi. Vent 110 may use such valves but preferably is a specialized design to facilitate the present invention. For example, vent 110 is preferred to accommodate any hot gases that could be generated during a thermal event addressed by system 110. The accommodation includes allowing for egress of the hot gases in such a way to reduce risks to passengers, first responders, and persons surrounding vehicle 130. For example, vent 110 could be coupled to, or incorporated into, a metal duct that conveys any hot gases outside an envelope of vehicle 130. In some embodiments, there will be separate vents for atmospheric equalization and hot gas release. For example, hot gas release vents may open wider in response to excessive pressure and/or heat. As used herein, valve is an expansive term including devices, active or passive, for controlling flow of fluids (e.g., water or gas or the like).

Additionally, one or more vents 110 are positioned to permit egress of any internal gas that is displaced by the addition of water into enclosure 130. Vents 110 serving this purpose are arranged in strategic locations to permit almost complete evacuation of internal gas (and therefore complete filling of enclosure 105 with water) although some implementations may use a single appropriately located vent. That vehicle 130 may have different orientations, vents 110 are positioned in anticipation of some of the possible orientations to permit sufficiently complete evacuation while in these orientations. It is preferred that enclosure 105, when possible, be able to retain distributed water throughout. Therefore vents 110 are preferably implemented to allow gases to escape while inhibiting water egress.

Fill port 115 is designed to allow unidirectional ingress of water into enclosure 105 while inhibiting egress of gases from enclosure 105. There are many different ways that this may be achieved, typically by use of some form of selectively permeable obstruction. For example, fill port 115 may include a pressure valve that resists backflow (i.e., out of enclosure 105) while opening in response to sufficient positive pressure. The valve opening permits water to flow into enclosure 105. It is desirable that fill port 115 be configured to respond to the typical level of water pressure that is able to be generated by first responders and the like. Alternatively a burst disk may be used as the selectively permeable obstruction that ruptures in response to sufficient pressure while retaining internal gases.

In another example, the selectably permeable obstruction may simply include a specially designed region in a wall of enclosure 105 that has been mechanically weakened. It is not sufficiently weakened that is unable to resist rupture from internal gas pressure, however it is configured to open in response to application of sufficient external water pressure.

As representative numbers, the types of pressure that may be used for actuation of fill port 115 is a range of 10-50 psi. Of course other ranges, such as 20-100 psi or 30-80 psi may be more appropriate (currently many new fire trucks are able to easily generate 100 psi). The actuation pressure should be set according to be greater than a maximum expected differential pressure between the inside and the outside of enclosure 105, but less than water pressure commonly available to the relevant first responders.

In some scenarios, enclosure 105 will be mounted to a chassis of vehicle 130 which would often make a surface mounted fill port 115 inaccessible. In some cases it may be possible to remove a concealing panel or cosmetic covering to allow access to such a fill port 115. However, in some cases fill port 115 will include the coupler made up passageway 120 and externally available port 125. Such a configuration provides more flexibility in locating vent 110 and port 115.

With the coupler, it is contemplated that externally accessible port 125 is positioned for most convenience to potential users and passageway 120 provides a channel to communicate the water from the user into enclosure 105. In such a case, the selectably permeable obstruction may be incorporated into passageway 120 and/or port 125 when necessary and/or desirable. Also, with such a solution, it may be the situation that passage 120 and/or port 125 could be integrated into a structure of vehicle 130 with passageway 120 assembled and sealed to enclosure 105 when the battery pack is installed into vehicle 130.

While use of the coupler extends the scenarios by which the embodiments of the present invention may be used, it is still the case that port 125 may be desirably concealed. For example it may be desirable/necessary to conceal port 125 (or fill port 115) behind a hatch or section of a body panel. In some cases, a cap may be used to cover an opening, and in some cases the cap may require a special tool or key in order to be opened.

In some implementations, it is desirable to provide for multiple access points into enclosure 105. Depending upon location and vehicle orientation, there are situations where use of a single port may result in port blockage/damage/nonfunctioning status. Thus it is the case that some implementations use multiple locations for ports 115 and/or ports 125. As noted above, the ports, when accessed, should be located as far as possible from vents 110 that may eject hot gases. There are many considerations for placement of ports 115/125, including safety of, convenience for, and accessibility by persons using the ports. Some candidate locations for the ports include positions behind and above front wheel wells, trunk, and between the front seats inside the passenger compartment. Factors to consider include safety for the responders, accessibility during anticipated vehicle orientations, and likelihood of damage.

It is a further feature of some embodiments to provide for latching/locking of water dispensing systems to port 115/125. One way to do this is to include a standard fitting complementary to a type of water dispensing systems frequently used by first responders. These may be 2 or 2.5 inch fittings with NHS thread, for example. Alternatively a smaller diameter may be used, particularly if a smaller size were standardized and adopted by enclosure/vehicle manufacturers. Virtually any fitting design may be used.

In operation, when it is desired to provide water inside enclosure 105, port 125 is accessed. The access may include opening a hatch or removing a panel or other cosmetic device to make port 125 externally accessible. Furthermore, in those situations in which a cap is used to cover, protect, and/or lock passageway 120, that cap is removed. A special tool or key may need to be used to facilitative this removal step.

A hose or other dispensing system is fitted to complementary fittings of port 125 and water dispensation is initiated. As water flows into passageway 120, water pressure builds up until a sufficient pressure exists to trigger the selectably permeable obstruction (e.g., valve or plate or the like) that allows egress of the water into enclosure 105. As water flows into enclosure 105, some of the internal gases are displaced and exit from vent 110. Water continues to be dispensed until all the applicable cells are cooled by water. The water cools any hot spots and quickly suspends any potential or actual runaway thermal events.

Figure 2:
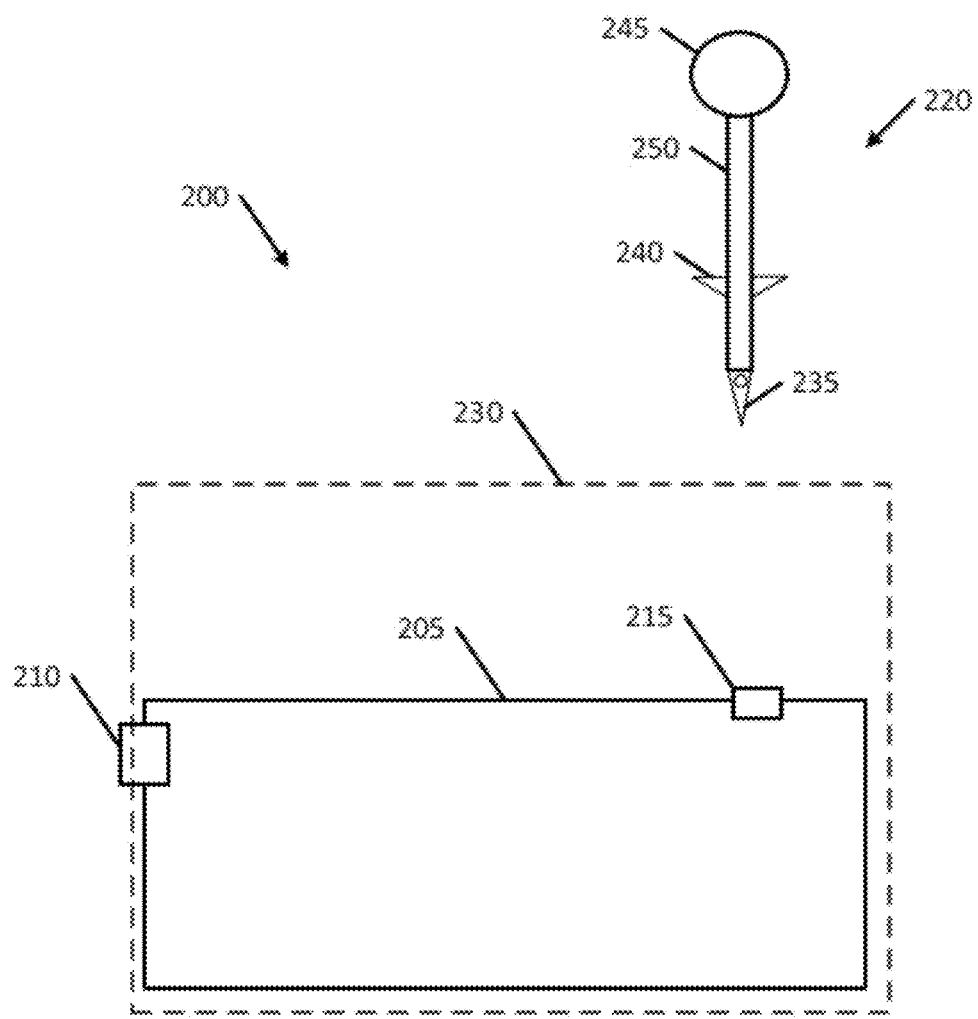
FIG. 2 is a schematic block diagram illustrating a preferred alternate embodiment of the present invention.

FIG. 2 is a schematic block diagram illustrating a preferred alternate embodiment of the present invention for an enclosure perforating system 200. System 200 includes an enclosure 205 for a high electric energy density storage system. Enclosure 205 includes one or more exit vents 210 and one or more perforation regions 215. As explained further herein, perforation regions 215 may include a range of solutions including location/instruction indicia, mechanically weakened portions, and/or couplings/fasteners that may aid in perforation. Specifics of an implementation of region 215 influence design and implementation of a perforation tool 220. Perforation tool 220 varies from a tool designed to achieve sufficient mechanical advantage to perforate a hardened enclosure 205 without mechanical weakening of region 215 to tools that gain significant advantage from advance preparation. In these situations, it is desirable that tool 220 perforate the enclosure in such a way that enough integrity remains of a wall of enclosure 205 nearby region 215 after perforation that the thermal control agent may be effectively communicated inside enclosure 205. Thus tool 220 provides a specialized and controlled perforation of enclosure 205. System 200 of the preferred embodiment is incorporated into, and includes in some implementations, a vehicle 230.

As described herein, there are at least two scenarios where system 200 is advantageous because fill port 115 is unavailable. Either enclosure 205 was manufactured without the fill port or the provided fill ports are inaccessible. In these situations, and more, system 200 offers many advantages.

As noted above, enclosure 205 is preferably a sealed, rugged metallic case that provides the structural, environmental, and safety protections of the battery pack. Not shown are the many internal energy storage elements that make up the energy storage characteristic of the pack. While the specifics of battery pack design will vary, the following description is provided to simplify a discussion of the present invention.

Because a first responder is using perforation tool 220 to actually breach the wall of enclosure 205, these considerations are more important. Due to the nature of the use of tool 220, it is likely made in large part of metal and piercing enclosure 205 with such a metal tool could lead to undesired consequences when not done properly to help reduce risks of improper breaching of enclosure 205.

A simple measure, when considering the act of perforating enclosure 205, is to identify for the first responders those locations where enclosure 205 may be breached. One or more regions 215 provides such visual guidance, at a minimum. Preferably, regions 215 also provide some type of mechanical advantage to the first responder. For example, region 215 may identify a specially weakened location(s) for enclosure 205 not only where it is safe to breach, but also where breaching may be performed with less effort or risk.

In some implementations, region 215 is a scored perimeter designed to break under the typical pressures anticipated to be easily applied by tool 220. The weakened location may be constructed of the typical enclosure material (e.g., aluminum or steel) at the typical thickness, but is sufficiently weakened by the score or other mechanical structure alteration. It is preferred that the weakened location not break in response to the heat from a battery thermal event, as hot gases may exit around region 215 where a first responder may be attempting to inject the water. Region 215 preferably defines an entry pathway to enclosure 205 that allows a portion of tool 220 to enter the enclosure such that water may be injected.

Region 215 is preferably separated from high voltage conductors or battery cells to minimize the risk of electric shock. An electric shock requires the completion of a circuit from two locations within the battery pack at different voltages, which is difficult to achieve under normal circumstances as the outer wall of enclosure 205 is electrically isolated from the energy stored within. The small risk of electric shock may be enhanced under vehicle crash conditions when a portion of enclosure 205 may be in electrical communication with at least one portion of the high voltage chain.

Region 215 may respond to a sharp or blunt tip with a force of not less than 5 lbs, but not greater than 100 lbs. Region 215 should be located as far as possible from hot gas ejection locations. Preferably region 215 should also be located in an area less likely to be damaged in the event of a crash. There may be more than one region 215 to facilitate access after changes in a vehicle orientation (e.g., a crash) should one region 215 become blocked or damaged. Candidate locations include behind the front wheel wells, the trunk, and between the front seats. The location of region 215 should facilitate use of tool 220 by the first responders. For example, for a tool requiring application of significant force, a location for region 215 lower on vehicle 230 may allow easier application of this perforating force. When possible it is desired that a design of enclosure 205, region 215 and perforations from tool 220 in response to a thermal event must be sufficiently robust such that enclosure 205 remains capable of retaining water to as great a degree as possible/practicable.

Region 215 may, in some embodiments, include more than an indicia and/or a mechanical weakened wall. In some instances it may be desirable to provide external elements attached to a wall of enclosure 205 near region 215 to aid in perforation and/or filling. For example, attachment of a mechanical "lip" or other structure may be used as a fulcrum or other anchor to multiply the applied mechanical force and make perforation simpler, more efficient, and safer. In some cases, a fastener may provide an ability for attachment of tool 220 such that mechanical advantage is achieved by rotation, twisting, rocking, pivoting, reciprocating, or other movement of tool 220 achieves perforation.

There are similarities between implementations of the embodiments shown in FIG. 1 and the embodiments of FIG. 2. As a generalization, the embodiments of FIG. 1 include a pre-perforated enclosure with the fill port and FIG. 2 include implementations that require the responder to perforate enclosure 205. In both cases it is desired to efficiently and safely do this.

Region 215 is at least a partial solution and in some cases it may be enough to permit control of any runaway thermal condition inside enclosure 205 (such as where region 125 includes a hose fitting allowing ingress of water following strategic perforation) without use of special tool 220. It is also possible that tool 220 alone, without region 215 may, in some implementations, be sufficient. However, it is anticipated that both components will be used in most implementations of the preferred embodiments.

As described herein, tool 220 may offer both a perforation function and a communication function, with any particular tool 220 emphasizing one or both functions as necessary in any particular context. A preferred embodiment of tool 220 is required to pierce enclosure 205 at region 215 and facilitate injection of water within. Tool 220 includes an engaging tip 235, preferably made of metal, a force application mechanism 240, a port 245 and a communication channel 250 connecting port 245 to tip 235. Channel 250 includes a long, water conveying passageway, made of either metal or an electrically insulating, high temperature material such as fiberglass composite, ceramic, or the like. An electrically insulating material, at least on an exterior of channel 250, provides an additional barrier to any possibility of an electric shock. Port 245 preferably includes a fluid fitting that is complementary to standard first responder equipment such as a fire hose.

Tool 220 also may include one or more features for applying the force required, or enhancing the applied force, used to perforate enclosure 205, such as at a weakened location (e.g., region 215) of enclosure 205. Embodiments of these features may include mechanical elements designated as force application members 240 (shown here as foot pegs). These force application members 240 may include a location on tool 220 with which to strike tool 220 with another object, for instance a hammer, used to apply the perforating force.

Other implementations of tool 220 include hydraulic or pressure-actuated components that are designed to use water pressure (e.g., a device not too dissimilar from a jack hammer, pile driver, or the like). For example, an embodiment of tool 220 uses water pressure to activate a piston within a cylinder. Some of these implementations are improved by providing for an attachment point near region 215 to permit tool 220 to lock onto a portion of enclosure 205 or other vehicle structure (e.g., through use of a quarter turn or other fitting or fastener with NHS threads, or the like), force may be applied by such a piston between region 215 and the attachment location. Water in the range of about 5-100 psi, say pressure at 40 psi could produce 400 lbs of force given a piston area of 10 square inches, more easily pushing tip 235 inside enclosure 205. In some tools 220, separate valves may be required to activate a water filling the cylinder for operating the force application feature and to initiate the flow of water within the enclosure for the cooling function.

Tip 235 may be fitted with recessed passageways that allow air to exit from enclosure 205 as enclosure 205 is filled with water. However, tool 220 should fit close enough within any perforation it creates to inhibit any flow of hot gas from the breach location. Once inserted, tool 220 should likely remain attached to enclosure 205 until any thermal runaway event has ended. Preferably water should continue to be applied until enclosure 205 is filled. Enclosure 205 and vehicle 230 structure are preferably designed to provide access to region(s) 215 from outside vehicle 230. In some cases, this access may be provided by designing a mechanical channel clear of all vehicle and powertrain structures. This channel may be cosmetically concealed by a hatch, flap, vehicle body panels, or the like. As noted above, tool 220 may be utilized without a predetermined weakened location in the battery enclosure, though it is preferred. Providing a weakened wall, or a mechanical attachment, reduces the amount of force necessary to perforate enclosure 205 which is safer for the first responders and helps to achieve a desired goal of maintaining a greater degree of enclosure integrity for water retention to enhance cooling/controlling of any runaway thermal event.

While the above discusses that system 200 is advantageous in at least two primary scenarios, there are other situations in which system 200 provides benefits. For example, in the discussion of FIG. 1, arrangement of vents 110 was described. Part of this discussion included an idea that placement of vents 110, in some situations, could be important to permit gas displaced by the thermal control agent entering into the enclosure to escape. Some implementations of perforation tool 220 could, in some circumstances when it was safe to do so, provide a mechanism to provide ventilation perforations in locations to permit some of this gas to escape. In these situations it may not be necessary to attach perforation tool 220 to the wall of enclosure 205 and initiate transfer of the thermal control agent into enclosure 205.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A perforation-enabled battery enclosure system for a vehicle battery pack, the system comprising:
   a thermal-control-agent-retaining enclosure of a traction battery pack including a plurality of interconnected batteries; and
   first means for allowing controlled breaching that defines destructive puncturing of the enclosure from outside, the puncturing of the enclosure defining a second means for permitting an ingress of a sufficient amount of a thermal-control agent into said enclosure through said second means to terminate a runaway thermal event in the battery pack, the first means further permitting extension of a perforation tool, through the second means into an interior of the enclosure, such that the perforation tool is separated from the battery pack and conductors.

2. The system of claim 1 wherein said thermal-control agent is a fluid.

3. The system of claim 2 wherein said fluid includes a major portion of $H_2O$.

4. The system of claim 1 wherein said first means includes an attachment structure cooperable with a perforating tool providing mechanical advantage to said perforating tool when breaching said enclosure.

5. The system of claim 1 wherein said first means includes an attachment structure cooperable with an attachment system providing coupling to said enclosure permitting said ingress of said thermal-control agent to be pressurized at a pressure range of about 5-100 psi without decoupling.

6. A perforation-enabled battery enclosure system for a vehicle battery pack, the system comprising:
   an electric vehicle including a chassis and a body;
   a thermal-control-agent-retaining enclosure of a battery pack including a plurality of interconnected batteries;
   first means for allowing controlled breaching that defines destructive puncturing of the enclosure from outside, the puncturing of the enclosure defining a second means for permitting an ingress of a sufficient amount of a thermal-control agent into said enclosure through said second means to terminate a runaway thermal event in the battery pack; and a third means, said third means including a tip, a fill port, and a channel communicating said fill port to an aperture defined proximate said tip, said third means for destructively puncturing and mechanically breaching said enclosure to define said second means, said third means further for engaging said enclosure to resist disengagement when said thermal-control agent is pumped into said enclosure through said third means at a pressure in a range of about 5-100 psi, the first means further for permitting extension of the third means, through the second means into an interior of the enclosure, such that the third means is separated from the battery pack and conductors.

7. The system of claim 6 wherein said enclosure is coupled to said chassis and wherein said first means is structurally isolated from access external to said vehicle.

8. The system of claim 6 wherein an external element of said vehicle includes an operation mode permitting external access to said first means.

9. The system of claim 6 wherein said first means includes an attachment structure cooperable with said third means providing mechanical advantage to said third means when breaching said enclosure.

10. The system of claim 6 wherein said third means includes an attachment element and wherein said first means includes an attachment structure cooperable with said attachment element providing attachment of said third means to said enclosure permitting said pressurized ingress of said thermal-control agent.

* * * * *